Sept. 2, 1941.　　W. C. BUTTNER ET AL　　2,254,209

VALVE

Filed Feb. 23, 1940

Inventors.
William C. Buttner
Harold L. Norway.
by Parker & Carter.
Attorneys.

Patented Sept. 2, 1941

2,254,209

UNITED STATES PATENT OFFICE 2,254,209

VALVE

William C. Buttner, Winnetka, and Harold L. Norway, Evanston, Ill., assignors to The Bastian-Blessing Company, Chicago, Ill., a corporation of Illinois Application February 23, 1940, Serial No. 320,452

1 Claim. (Cl. 137—53)

This invention relates to a valve construction and has for one object to provide means for relieving pressure and preventing the accumulation of fluid under or behind a sealing member in a valve. In pressure relief valves where a sealing member such as a rubber or synthetic rubber gasket or disc is used or where the equivalent of such a member is used, the gas or other fluid in contact with the gasket or sealing member may be absorbed by that sealing member and passed through it. Experience has shown that certain gases such as liquefied hydro-carbon gases and others will permeate the disc or sealing member and a certain quantity of this gas will build up between the sealing member and the valve or retaining member which carries it. It is one object of the invention to prevent this building up and accumulation of fluid which has passed through the sealing member. It is another object of the invention to conduct away such gas to a point where its presence can do no harm.

Other objects will appear from time to time throughout the specification and the claim.

The invention is illustrated more or less diagrammatically in the accompanying drawing, wherein.

Like parts are designated by like characters throughout the specification and the drawing.

Figure 1:
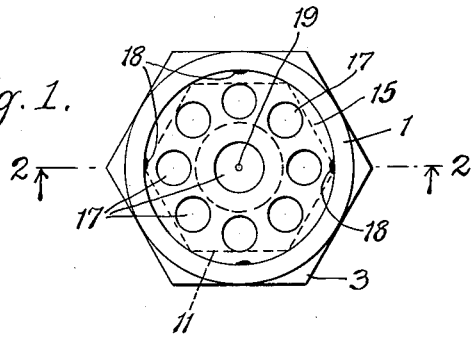
Figure 1 is a plan or end view of one form of a pressure relief valve in which the present invention is embodied.

1 is a pressure relief housing. It is provided with a hollow interior 2. It may be given an angular cross section or shape 3 at one point to receive a tool by means of which the housing is seated and unseated. In the particular form here shown, an integral connector member 4 is joined to the housing 1 and is exteriorly threaded as at 5 to be screwed into a correspondingly threaded opening or hole in a wall or seating member 6. This may be the wall of a tank or may be a plug or insert which is itself seated in the wall of the tank. The invention is not limited to any particular mounting means or association. The portion 4 is provided with a passage 7 which terminates at its inward end in a raised valve seat portion 8 which is preferably downwardly and outwardly inclined as at 9. An opening 10 may be formed in the wall of the housing 1. This opening, which is frequently called a "weep hole," is to prevent water accumulation within the valve housing and to permit it to discharge or "weep" through the "weep hole."

Mounted within the housing 1 is a spring guide 11 which, although it is guided by the wall of the space 2 within the housing 1, is either of such shape or so loosely fitted therein that gas may escape outwardly beyond it through the housing. This guide may be provided with a central depression 12 to receive one end of a compression spring 13, the other end of which is seated in a depression 14 formed in an adjusting screw 15 which is exteriorly threaded to engage corresponding threading 16 formed on the inner face of the housing member 1 adjacent its outer end. The member 15 is provided with one or more perforations 17 and may be held in place by solder seals 18, 18, if desired.

The spring guide 11 is provided with one or more perforations 19 extending from its one side to its other side. The perforation or passage 19, whether there be one or more, extends from the inner face of the sealing disc or gasket described below toward the outer or discharge end of the housing 1. This is true whether the perforation passes through the body of the valve 11 to its center, as shown, or passes through the valve in some other direction. Instead of a perforation, a groove or depression might be formed in the face of the valve which contacts the sealing member. The spring guide is reduced and exteriorly threaded as at 20 to receive a disc retainer 21 which itself engages the threads 20 of the member 11. This disc retainer has an inwardly extending flange 22 which holds the sealing disc 23 in place upon the inner face or side of the spring guide 11.

Figure 2:
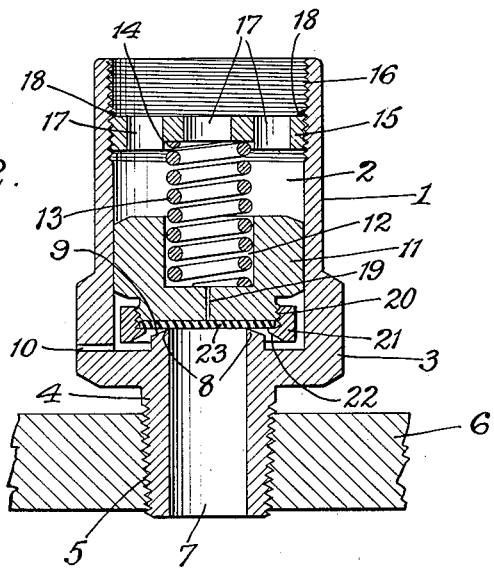
Figure 2 is a longitudinal cross section taken at line 2—2 of Figure 1.
Figure 3:
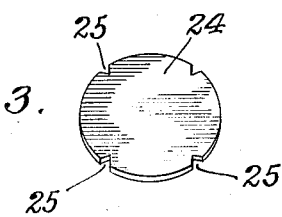
Figure 3 is a perspective view showing a modified form of sealing member.

The disc shown in Figure 2 is preferably circular. A modified form of disc 24 is shown in Figure 3. This disc is provided with one or more notches 25. Such a disc may be substituted for the round disc of Figure 2 and when the disc of Figure 3 is used the perforation or passage may or may not be dispensed with as desired. If a disc of the form shown in Figure 3 is used, the notches are so proportioned that their inner ends or points extend close to but short of the portion of the valve seat 8 upon which the sealing member is seated.

Although there is shown an operative form of the device, it will be understood that many changes in the form, shape and arrangement of parts might be made without departing from the spirit of the invention; and it is wished that this showing be taken as, in a sense, diagrammatic.

The use and operation of this invention are as follows:

As shown, the invention is embodied in a pressure relief or safety valve. The parts are assembled as shown and the valve is in position communicating with the interior of a vessel in which fluid is contained under pressure. The compression of the spring may be adjusted by the member 15 so that the valve will yield and open in response to a predetermined pressure.

It is advantageous in such a valve to use some form of sealing means. As here shown, this comprises a member 23 or a modified member 24. This may be formed of natural rubber or synthetic rubber or some other product or material which is sufficiently compressible or which otherwise effects a proper sealing.

It has been found that many other materials which are proper sealing means in this connection are slightly pervious to gases and liquids which may be kept within the container to which the valve is applied. The degree of leakage which occurs from this cause is very slight but it is sufficient to permit a small quantity of the material to pass through the sealing member and, unless means are provided to prevent it, this gas or liquid which passes through the sealing means would be entrapped behind it, and this quantity might be sufficient to cause unsatisfactory or premature valve operation. In the present invention, material which in any way passes through the sealing member 23 and reaches its outer side—that is to say, the side away from the container—will not be entrapped or retained because it passes through the perforation 19. Consequently, no material builds up back of the sealing member and unsatisfactory operation is prevented. The perforation 19 is of such size that it does not materially weaken the sealing member 23 and the latter will not be broken or forced through the perforation. One or more perforations may be used.

In the modified form shown in Figure 3, a sealing member 24 is used which has notches 25 in its edges. These approach close to but do not reach the point on the seat 8 upon which the sealing member is seated. By furnishing escape passages at the edge of the disc, the notches 25 prevent building up of pressure back of the sealing disc. For some purposes, the disc 24 will be used with a member 11 which has no perforation 19. For other purposes, it will be used with a perforated member. Thus, the invention may be embodied in an unnotched sealing member 23, using the escape passage 19, or it may be embodied in a notched member 24 with or without the additional passage 19 for the escape of fluid.

We claim:

In combination in a pressure release valve, a hollow housing means defining a discharge opening therethrough, a valve seat within said housing and about said opening, a relief valve adapted to be seated on said seat, yielding means holding said valve upon its seat, and means for holding said yielding means at a predetermined adjustment to exert a predetermined closing force on said relief valve, a sealing member positioned upon the seating face of said valve and extending across said discharge opening, means for retaining the edges of said sealing member in place, and means for preventing the accumulation of fluid seeping through the sealing member between said valve and said sealing means, comprising a vent perforation extending through said valve member in communication with the face of said sealing member which is away from the valve seat, whereby fluid under pressure seeping through said sealing member will be vented through said perforation without destroying the adjustment of said valve.

WILLIAM C. BUTTNER.
HAROLD L. NORWAY.